United States Patent [19]

Funk et al.

[11] 4,183,760

[45] Jan. 15, 1980

[54] HIGH-STRENGTH ALUMINA CERAMIC PRODUCT AND METHOD OF FORMING

[75] Inventors: James E. Funk, Alfred; Ira O. Knickerbocker, Victor, both of NY

[73] Assignee: Electric Power Research Institute, Inc., Palo Alto, Calif.

[21] Appl. No.: 852,693

[22] Filed: Nov. 18, 1977

[51] Int. Cl.$^2$ .................... C04B 33/26; C04B 33/24; C04B 35/10

[52] U.S. Cl. ........................................ 106/46; 106/45; 106/73.4

[58] Field of Search ............................ 106/45, 46, 73.4

[56] References Cited

U.S. PATENT DOCUMENTS

| | | | |
|---|---|---|---|
| 2,898,217 | 8/1959 | Selsing | 106/46 |
| 3,553,063 | 1/1971 | Megles | 106/45 |
| 3,585,056 | 6/1971 | Bush | 106/46 |
| 3,686,007 | 8/1972 | Gion | 106/46 |

OTHER PUBLICATIONS

Blodgett, W. E., "High Strength Alumina Porcelains," *The American Ceramic Society Bulletin*; vol. 40, No. 2, (1961) pp. 74–77.

*Primary Examiner*—Delbert E. Gantz
*Assistant Examiner*—Mark Bell
*Attorney, Agent, or Firm*—Flehr, Hohbach, Test, Albritton & Herbert

[57] ABSTRACT

A high strength ceramic product especially adapted for electrical porcelain insulators and including alumina, clay, and flux (nepheline syenite or potassium feldspar). The alumina content is from 45 to 60% by weight of the ceramic body. The product is formed by conventional wet processing. By controlling the size of alumina and flux, a high modulus of rupture (in excess of 30,000 psi) is imparted to the fired ceramic product.

8 Claims, 3 Drawing Figures

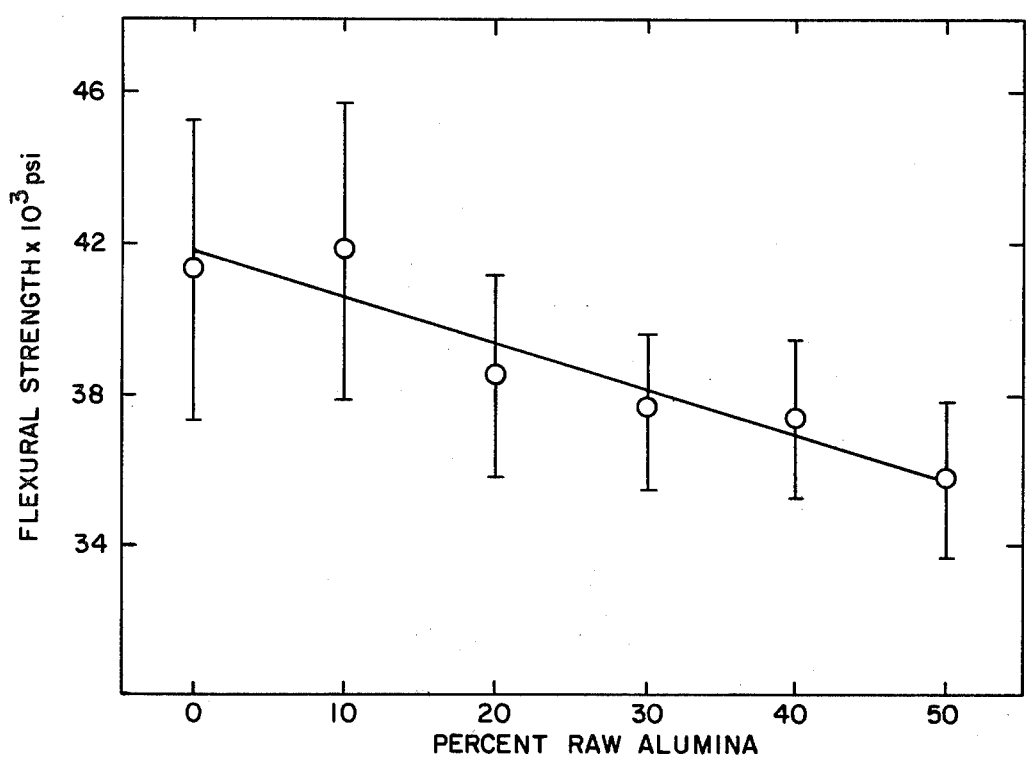
FIG.—1 FLEXURAL STRENGTH AS A FUNCTION OF PERCENT RAW AGGLOMERATED ALUMINA ADDED
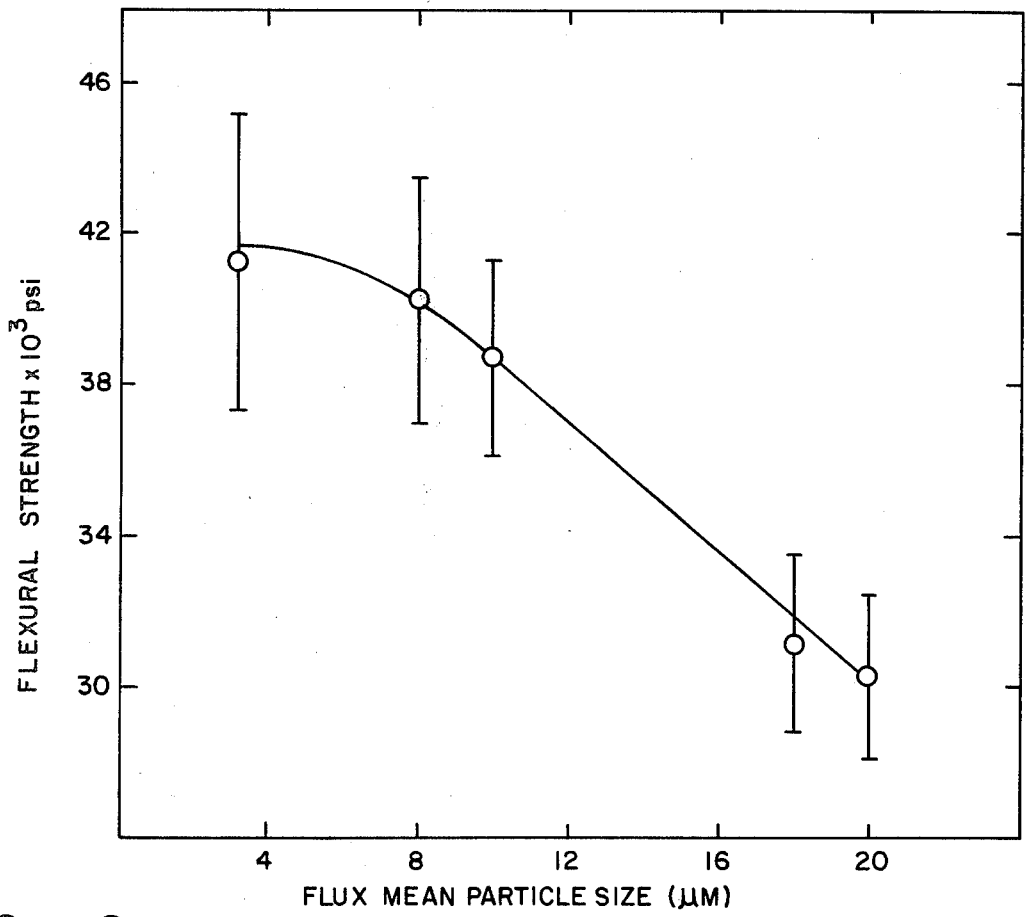
FIG.—2 FLEXURAL STRENGTH AS A FUNCTION OF FLUX MEAN PARTICLE SIZE

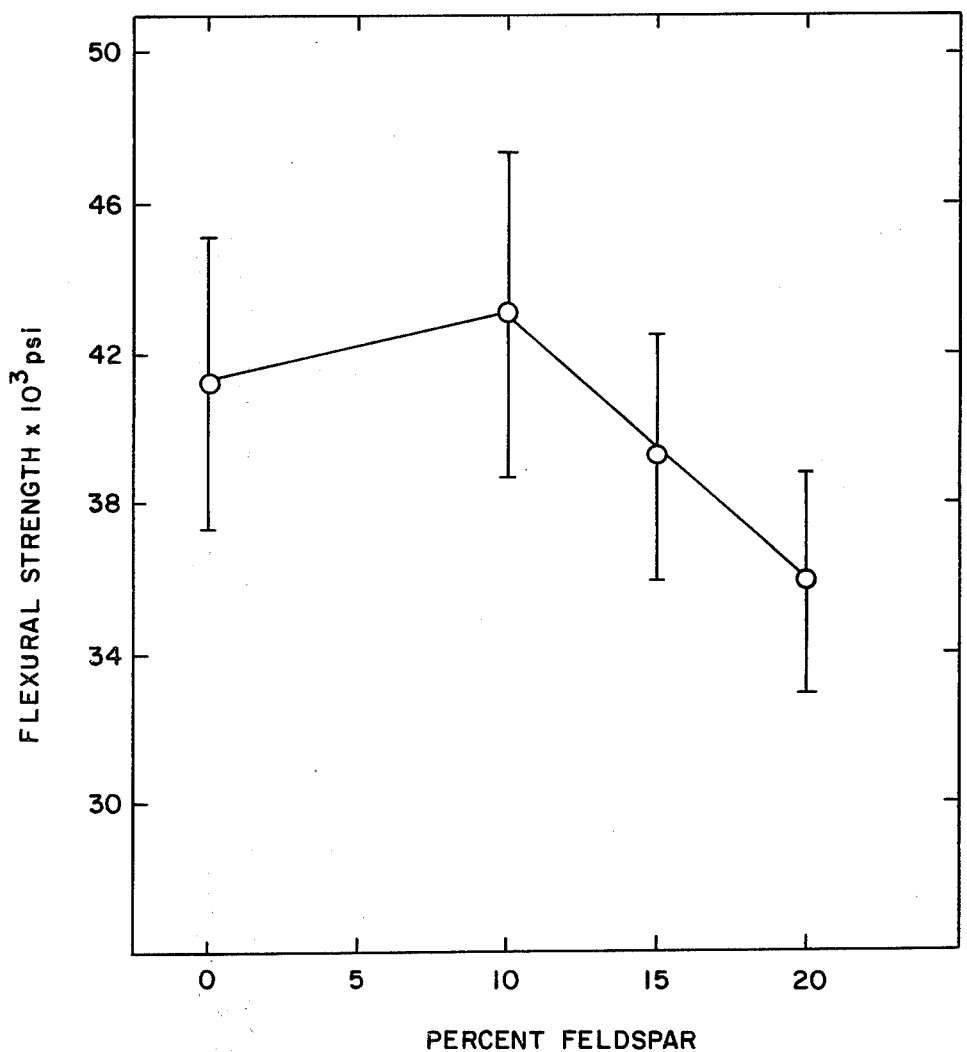
FLEXURAL STRENGTH AS A FUNCTION OF POTASH FELDSPAR SUBSTITUTED FOR NEPHLINE SYENITE AT THE SAME 4 MICRON MEAN PARTICLE SIZE
FIG.—3

HIGH-STRENGTH ALUMINA CERAMIC PRODUCT AND METHOD OF FORMING

BACKGROUND OF THE INVENTION

The present invention relates to a high strength alumina porcelain and its formation by wet processing, particularly for use as electrical porcelain insulators.

Alumina has been used in electrical porcelain bodies to provide a high mechanical and electrical strength. Such porcelain is used to mechanically hold up a high tension line or piece of electrical apparatus and to provide adequate insulation. It is recognized that a certain increase of strength of such bodies is obtained by increasing the alumina content up to 40% alumina. In a book entitled "Current Development in The Whiteware Industry", George A. Kirkendale, Editor, University of New York College of Ceramics at Alfred University, Alfred, N.Y., (1966), beginning at page 29, it is stated that although there is an increase in body strength with increasing amounts of alumina, a range of 30 to 40% alumina appears the most reasonable. This is due to the problems inherent in providing sufficient plasticity to porcelains of high alumina content to obtain a workable aqueous mass for wet forming a ceramic body prior to firing. This is important because the shapes of electrical porcelain bodies may be relatively complex.

Examples of ceramic bodies including 40% calcined alumina are disclosed in U.S. Pat. No. 2,898,217. Such product (including 20% nepheline syenite, 2% magnesium oxide, and 38% clay) has a modulus of rupture of 26,000 psi. The patent relates to the use of nepheline syenite to reduce the quartz content of the charged ceramic mix to thereby increase the strength of the final product. The patent indicates that the process would not be applicable to alumina contents in excess of 45%. Presumably, this is because at higher alumina content, the ceramic mix would not be suitable for wet processing.

Very high strength alumina porcelains are known for use as electrical insulators. For example, an article by W. E. Blodgett entitled "High Strength Alumina Porcelains", The American Ceramic Society Bulletin, Vol. 40, No. 2 (1961), discloses ceramic bodies including 65% alumina. However, the total disclosed clay content is only about 20%, insufficient to provide the requisite workability for wet processing. Thus, the ceramic body was formed by dry pressing. This technique is not suitable for commercial production of the common electrical insulator shapes which usually include undercut shed designs and variable wall thicknesses. Even if such dry pressing techniques were developed for such shapes, the process would be very costly.

SUMMARY OF THE INVENTION AND OBJECTS

In accordance with the present invention, alumina, clay and flux, all in fine powder form, are mixed with water to form a plastic mass which is shaped by conventional wet processing techniques and fired into a ceramic body of high strength (modulus of rupture greater than 30,000 psi). The product is particularly suited for use as an electrical porcelain insulator. The alumina content is from about 45 to about 60% by weight and is essentially free of large alumina agglomerates. The weight ratio of clay to flux is preferably at least 1:1, both components being in very fine powder form. All of these parameters contribute to the exceptional strength of the product.

It is an object of the invention to provide a high strength ceramic body formed of alumina porcelain suitable for use as an electrical insulator.

It is another object of the invention to provide a ceramic mix which is sufficiently workable to form a ceramic body of the above type by wet processing techniques.

It is a particular object of the invention to form an electrical insulator from the above ceramic product with a combination of excellent electrical characteristics and mechanical strength.

Further objects and features of the invention will be apparent from the following description taken in conjunction with the accompanying drawings.

BRIEF DESCRIPTION OF THE DRAWINGS

FIG. 1 is a graph illustrating the dependency of flexural strength upon the presence of large alumina agglomerates.

FIG. 2 is a graph illustrating the flexural strength of the fired ceramic product as a function of the flux mean particle size.

FIG. 3 is a graph of flexural strength as a function of potash feldspar substituted for nepheline syenite at the same 4 micron mean particle size.

DETAILED DESCRIPTION OF THE PREFERRED EMBODIMENTS

The high strength ceramic product of the present invention is formed essentially of alumina, clay, and a flux. Certain significant parameters have been found which permits the formation of a very high strength fired ceramic product using a relatively high alumina content, specifically from 45 to 60%, which is sufficiently workable in an aqueous dispersion to permit conventional wet working techniques to form the ceramic body. The following description will highlight important parameters of the ceramic product which contribute to this combination of exceptional properties.

The preferred technique for forming the ceramic product of the invention is to mix the alumina, clay, and flux in fine powder form with water to the consistency of a plastic extrudable mass, forming such mass into the desired configuration of a ceramic body, and drying and firing it. Forming the desired shape while the aqueous dispersion is in a flowable, plastic mass is termed "wet processing".

One suitable wet processing technique is to form the body into a low viscosity slip form by mixing with sufficient deionized water. A suitable density to provide proper mixing is on the order of 1.30 to 1.50 gm/cc. The ceramic mass is blunged and the slips then are lawned through a screen (e.g., 200 mesh size). Thereafter, the ceramic bodies are formed by first filter pressing the bodies at, say, a minimum of 90 psi for about 4 hours. The plastic mass is formed into the desired shape as by extrusion in a deairing pug mill. Thereafter, the ceramic body is formed on appropriate equipment to the insulator shape desired and dried (e.g., at 110° C. for 24 hours). Then, the bodies are in condition for glazing and firing. Alternatively, the extrusions may be dried to about 4% moisture and then dry finished on appropriate equipment to the shape desired. The piece is then ready for glazing and firing.

Another conventional wet process technique is to dry mix the ceramic components by a dry, muller type of mixing followed by the addition of sufficient moisture to form a plastic, workable body. Such body can then be formed into the desired configuration in the foregoing manner. The wet process techniques are particularly adapted to the formation of intricate electrical insulator shapes which typically incorporate undercut shed designs and variable wall thickness.

Dry pressing techniques at pressures on the order of 10,000 psi may also be employed to form the present ceramic bodies into simple shapes. However, it would be far more difficult to form bodies of intricate shapes by such dry pressing technique than by the foregoing wet process. Thus, wet processing is preferred to form electrical insulator shapes.

Firing of the foregoing porcelain bodies is performed at a heating rate and ultimate temperature which is dependent upon the particular composition. A typical firing range is on the order of 2100° F. to 2450° F. The lower end of this range is used for a low clay to flux ratio while the upper end is more suitable for a high clay to flux ratio.

It has been discovered that control of the particle size of the mix contributes significantly to the exceptional strengths of the ceramic products of the present invention. In general, it has been found to be preferable for all particles in the mix to be sized at a mean particle size no greater than about 20 microns.

The alumina which is used in the present ceramic product is suitably produced by the Bayer process. The resultant product includes a relatively large but variable proportion of agglomerates of the alumina particles substantially in excess of 20 microns, as large as 60 microns or more. It has been found that a porcelain product including alumina agglomerates of that size has a relatively low strength. It is believed that such low strength is because the glass phase surrounding the alumina grains is missing in the center of the agglomerates. This reduces the effective amounts of alumina in the porcelain. Also, such agglomerates are weakly bonded to the glass and so behave as pseudo-pores in relation to fracture propogation. Thus, the fracture will penetrate the equator of the agglomerate offering little resistance to the fracture.

It has been found that significant increases in the structural strength of the fired ceramic body are imparted by comminuting the alumina to break up the aggregates present in commercially available alumina powder. A particularly effective comminution technique is by vibro-energy milling at high frequency and low amplitude. In this type of milling, the coarse particles are preferentially comminuted to effectively reduce the maximum particle size. Suitable vibro-energy mills include the Sweco mill (Sweco Corp.) and the Palla-mill (Humboldt-Wedag Division of Deutz Corp of Germany). In this type of mill, the alumina may be treated as follows: a 70 wt.% solids slurry in water is milled for sufficient time (e.g., 1 hour) to break down the agglomerates to essentially individual crystals.

It has been found that comminution in accordance with the foregoing technique reduces the largest agglomerate size to substantially less than 20 microns, typically to 10 microns or less.

Experiments were performed illustrating the effect of vibro-energy milling employing a porcelain composition of 50% alumina, 30% Ajax-P type of clay, and 20% of nepheline syenite (Minex 10) flux. The raw or uncomminuted alumina from the Bayer process was mixed in various proportions from 0 to 50% with the vibro-energy milled alumina. The results of these tests are illustrated in FIG. 1. It is clear that flexural strength of the porcelain product is highly dependent upon the number of large agglomerates present in the body. It should be noted that various batches of alumina will vary in agglomerate size and quantity. The slope of FIG. 1 would be altered accordingly.

Another important feature of the invention is the ability to form a ceramic product of exceptional mechanical properties by the inclusion of a high alumina content in a body which can be formed by the foregoing wet process techniques. Excellent properties are obtained at an alumina content of about 45 to about 60% and preferably at least 50%. Flexural strength in excess of 30,000 psi are obtained at 40% alumina. At 50% alumina, the maximum mean flexural strength is on the order of 43,000 psi, while at 60% alumina, it is on the order of 34,000 psi. In any event, these are remarkable strengths, especially for an electrical porcelain which can be wet processed.

In general, the constituents of the present ceramic product are selected to minimize the presence of quartz particles. It has been found that such particles greatly reduce the structural strength of the final product. Thus, both the flux and clay components are selected to avoid the presence of any significant quantities of such material as an impurity. Ball clays having desirable plastic properties normally contain significant quantities of these impurities. When these clays are used, suitable techniques for removing these impurities may be used such as lawning, centrifugal cleaning and milling.

Flux material of a conventional type such as nepheline syenite or potassium feldspar may be employed in accordance with the present invention. The syenite is particularly suitable as it imparts a number of desirable properties. Its thermal expansion coefficient is similar to that of alumina. It is believed that this adds to the overall product strength as it avoids internal stresses within the porcelain microstructure which could otherwise tend to reduce its strength. Another advantage of the syenite is its ability to dissolve at least a portion of quartz impurities which may be present in the ceramic product. These effects may be illustrated by the higher strengths obtained from the nepheline syenite than from the potash feldspar of the same grain size distribution (4 micron mean particle size) as shown in FIG. 3.

Referring again to FIG. 3, it is apparent that ceramic products of exceptional strength are obtained not only with the preferred nepheline syenite flux but also with potassium feldspar flux so long as the particle size is relatively small. Although the specific particles of FIG. 3 have 4 micron mean particle size, good results are obtained at mean particle sizes no greater than about 10 microns.

One theory as to the increase of structural strength as the particle size of the flux decreases is as follows. As coarse flux particles melt during firing, the outer regions of the liquid chemically reacts with clay and alumina. The inner regions react to a much lesser degree. The differences in thermal expansion resulting from the different chemical compositions of the regions are believed to create stresses between them on cooling which reduces the overall structural strength of the porcelain product.

It has been discovered that the flexural strength of the porcelain product is highly dependent upon the mean particle size of the flux. This is illustrated in FIG. 2 which is a graph of flexural strength versus flux mean particle size for a product of the following composition: 50% milled alumina, 30% Ajax P type of clay, and 20% nepheline syenite type of flux. Referring to FIG. 2, it is apparent that there is a significant increase in the flexural strength from 20 microns to 10 microns size and thereafter from 10 micron to 4 micron in size. This is an unexpected phenomenon as the flux dissolves during firing to form the glassy phase. Very fine nepheline syenite sold under the trademark "Minex 7" and "Minex 10" by Indusmin, Ltd. is particularly suitable as it need not be comminuted further to form a suitable size. Minex 10 is sized at −10 microns (4 microns mean size); while Minex 7 is sized at −20 microns (8 microns mean size). Alternate sources may be used if comminution to suitable size is performed.

The clay component of the ceramic mixture may be of a conventional type. However, it is preferable that it be relatively free of quartz and lignite normally found in ball clays. Also, in view of the foregoing effects of raw material size on strength, it is preferable for the clay to be applied to the mix as a very fine powder. One clay which satisfies the above criterion without additional comminution grinding is a kaolin sold under the trademark "Ajax-P" by Georgia Kaolin Co., Inc. Other clays may also be employed such as are commonly available and well known to the industry provided they are effectively cleaned of quartz and lignite particles coarser than about 4 microns.

Another significant parameter of the present invention is the ratio of clay to flux. In general, as this ratio is increased, this leads to a corresponding increase in the firing temperature. For example, at a ratio of 2.33:1, the firing temperature is about 2450° F. while at a ratio of 0.67:1, the firing temperature is about 2100° F. On the other hand, the presence of the clay provides sufficient workability to an aqueous mass of the same for it to be extrudable or otherwise wet formed to intricate shapes suitable for electrical insulators. For this latter reason, it is preferable that the ratio of clay to flux be at least 1.0.

The composition and physical properties of a 40% alumina with various ratios of nepheline syenite flux to Ajax-P kaolin are illustrated in Table 1. The mean modulus of rupture, $\overline{X}$, was measured by the ASTM test at room temperature. The shrinkage was measured conventionally and calculated as follows:

$$\frac{(L_D - L_F)}{L_F} \times 100 = \% \text{ Linear Shrinkage}$$

Where
$L_D$ = length dry
$L_F$ = length fired

TABLE 1

Composition and Physical Properties of 40% Alumina Porcelain

|  | Raw Material Constituents (wt. %) | | |
| --- | --- | --- | --- |
| Al$_2$O$_3$ (vibro-milled) | 40 | 40 | 40 |
| Nepheline Syenite | | | |
| (a) Minex 10 | — | 40 | — |
| (b) Minex 7 | 20 | — | 40 |
| Ajax-P Kaolin | 30 | 10 | 19 |
| Green & Fired Properties | | | |
| Water of Plasticity | 22.2 | 16.8 | 16.5 |
| Max. Firing Temperature °F. | 2200 | — | 2075 |
| Shrinkage | 14.8% | — | 12.8% |

TABLE 1-continued

Composition and Physical Properties of 40% Alumina Porcelain

| Modulus of Rupture | | | |
| --- | --- | --- | --- |
| $\overline{X}$ (psi) | 31,000 (±5,900) | 24,000 (±3,400) | 25,200 (±2,800) |

It is apparent from the foregoing table that the product with the highest modulus of rupture was formed with a clay to flux ratio of 1:1. However, this product had the highest order of plasticity and also required the highest firing temperature.

Table 2 measures the same properties as Table 1 for four samples of 50% alumina and one sample of 60% alumina. The maximum modulus of rupture for the 50% alumina porcelain had a clay flux ratio of 1.5. When the ratio dropped below 1.1 to 0.67, the modulus of rupture was significantly reduced. Table 2 also illustrates that the 50% alumina porcelain had a higher modulus of rupture than the 60% alumina porcelain. This is probably because the total flux component within the body was insufficient to fill the interstices between the alumina particles. Porosity in this body was relatively high. Referring to Table 1, the 50% porcelain also had a higher modulus of rupture than the 40% porcelain. Thus, it is believed that the optimum porcelain is at an alumina content of 50 to 60%.

TABLE 2

Composition and Physical Properties of 50% and 60% Alumina Porcelain

|  | Raw Material Constituent (wt. %) | | | | |
| --- | --- | --- | --- | --- | --- |
| Al$_2$O$_3$ (vibro-energy milled) | 50 | 50 | 50 | 50 | 60 |
| Nepheline Syenite | | | | | |
| (a) Minex 10 | 20 | — | 30 | — | 20 |
| (b) Minex 7 | — | 20 | — | 30 | — |
| Ajax-P Kaolin | 30 | 30 | 19.0 | 19.5 | 19.5 |
| Bentonite | — | — | 1.0 | 0.5 | 0.5 |
| Green & Fired Properties | | | | | |
| H$_2$O Content | 20.7 | 20.2 | 19.9 | 18.2 | — |
| Max. Firing Temperature °F. | 2325–2455 | 2365–2500 | 2225 | 2225 | 2300–2500 |
| Shrinkage | 17.0% | 13.8% | 15.2% | 13.9% | 15.8 |
| Modulus of Rupture | | | | | |
| $\overline{X}$ (psi) | 37,700 | 37,700 | 29,000 | 31,000 | 34,000 |
| S | (±4,400) | (±5,600) | (±1,600) | (±3,900) | (±2,200) |

Referring to Table 3, refined mixed ball clays (Victor-type) were substituted for the Ajax-P kaolin clay of Table 2. The product, including 30% ball clay and 20% nepheline syenite had a modulus of rupture comparable to that of the Ajax-P kaolin composition of Table 2 at the same clay to flux ratio. The maximum modulus of rupture of Table 3 was measured and calculated as follows:

$$\overline{X} = 3/2 \times (Pl/bd)_2$$

wherein
$\overline{X}$ is in psi
P = load in lbs.

l = span between supports
b = width of rectangular bar
d = thickness of rectangular bar
and the ratio of l to d is greater than 8 to 1

The modulus of rupture does not reveal any direct correlation to the clay to flux ratio in this table.

TABLE 3

Composition and Physical Properties of 50% Alumina Porcelain

| | Raw Material Constituents (wt. %) | | | | |
|---|---|---|---|---|---|
| $Al_2O_3$ (vibro-energy milled) | 50.0% | 50.0% | 50.0% | 50.0% | 50.0 |
| Nepheline syenite Minex 10 | 15.0% | 17.5% | 20.0% | 22.5% | 25.0 |
| Refined Ball Clays (Victor) | 35.0% | 32.5% | 30.0% | 27.5% | 25.0 |
| Green & Fired Properties | | | | | |
| Water of Plasticity | 21.5% | 20.8% | — | 18.4% | 19.2 |
| Max. Firing Temperature °F. | 2350–2450 | 2350–2400 | 2250–2300 | 2150–2230 | 2160 |
| Shrinkage Max. | 17.0% | 16.5% | 15.5% | 15.0% | 16.0 |
| Modulus of Rupture $\bar{X}$ (psi) | 39,900 | 37,000 | 38,300 | 43,000 | 41,800 |
| S | (±2,300) | (±3,200) | (±3,200) | (±1,750) | (±3,500) |
| Mod. of Rupture $\bar{X}$ (psi) | 41,400 | 39,600 | 38,900 | 31,000 | 34,100 |
| S | (±7,000) | (±2,400) | (±6,200) | (±3,500) | (±2,000) |

The foregoing ceramic products of excellent mechanical strength possess electrical insulator properties (comparable to that of conventional alumina or quartz porcelain higher dielectric strength and slightly greater leakage current through the insulation, designated Tan δ). Such leakage is small enough to be insignificant compared to other losses on a line. A comparison of electrical properties is set forth in the following table:

TABLE 4

| Sample | Dielectric Breakdown Strength (0.125 in. samples) | Tan δ |
|---|---|---|
| Quartz porcelain | 300 | 0.0045 |
| Alumina Porcelain | 285 | 0.0075 |
| Subject Ceramic* | 307 | 0.0150 |

*Composition - Alumina (50%), Nepheline Syenite (20%); Clay-Ajax-P (30%)

A further disclosure of the nature of the present invention is provided by the following specific examples of the practice of the invention. It should be understood that the data disclosed serve only as examples and are not intended to limit the scope of the invention.

EXAMPLE

The 40%, 50% and 60% alumina materials of Tables 1, 2 and 3 were prepared as follows. The ingredients, in slip or dry form, were weighed out at a dry batch rate of 13,000 grams for each body. Enough distilled water was added to the batch to insure a low viscosity slip for proper mixing. (This occurred at a density between 1.30 and 1.50 gm/cc.) A laboratory size Cowles dissolver was used to blunge each body for 60 minutes. After blunging, the slips were lawned through a 200 mesh screen.

The bodies were then filter pressed at a minimum 90 psi for about 4 hours. From these filter pressed cakes, approximately 20 bars, 1 inch×0.5 inch×14 inch long were extruded in a laboratory size deairing pug mill. The sample of freshly pugged clay was then dried for 24 hours at 110° C.

After drying, the samples for the modulus of rupture tests were cut to 2.5"×0.25"×0.125" dimensions.

Bodies of the foregoing type were placed in the center of a gradient furnace refractory slab so that the bar length was perpendicular to the temperature gradient. The furnace was programmed to rapidly heat to a top temperature of 1400° C. (hot end). After 1 hour, the temperature profile was measured. Six bars were fired at any single temperature. These samples provide a profile of strength and shrinkage as a function of firing temperature to accurately charaterize the total effect upon the ceramic properties of any compositional change.

What is claimed is:

1. The method of producing a high-strength ceramic body comprising the steps of comminuting alumina to break up essentially all agglomerates in excess of 20 microns, mixing said comminuted alumina, clay, and flux with water in sufficient quantity to form a plastic extrudable aqueous mass, said alumina comprising from about 45 to about 60% by weight of solids content of the mass, extruding said aqueous mass into the desired configuration, and drying and firing the mass to form a ceramic body.

2. The method of claim 1, in which the mean particle size of the flux in said aqueous mass is no greater than about 20 microns.

3. The method of claim 1 in which the desired configuration is an electrical insulator.

4. The method of claim 1 in which said alumina comprises at least 50% of said mixture.

5. The method of claim 1 in which said flux comprises nepheline syenite.

6. The method of claim 1 in which the weight ratio of clay to flux is at least 1:1.

7. The method of claim 1 in which the total clay and flux comprises at least 35% of the solids content of the aqueous mass.

8. The method of producing a high-strength ceramic body comprising the steps of mixing alumina, previously comminuted to break up essentially all agglomerates in excess of 20 microns, with clay, flux and water in sufficient quantity to form a plastic extrudable aqueous mass, said alumina comprising from about 45 to about 60% by weight of the solids content of the mass, extruding said aqueous mass into the desired configuration, and drying and firing the mass to form a ceramic body.

* * * * *